United States Patent [19]
Ader et al.

[11] Patent Number: 4,844,815
[45] Date of Patent: Jul. 4, 1989

[54] STABILIZATION OF MERCURY-CONTAINING WASTE

[75] Inventors: Milton Ader, Park Forest; Edward F. Glod, Olympia Fields; Edward G. Fochtman, Elmhurst, all of Ill.

[73] Assignee: Chemical Waste Management, Inc., Oak Brook, Ill.

[21] Appl. No.: 231,561

[22] Filed: Aug. 12, 1988

[51] Int. Cl.$^4$ ............................ C02F 1/62; B09B 3/00
[52] U.S. Cl. .................................... 210/751; 210/914; 106/900; 405/129
[58] Field of Search ............... 210/751, 763, 913, 914, 210/901, 724, 726; 106/118, 900; 405/129

[56] References Cited

U.S. PATENT DOCUMENTS

| | | | |
|---|---|---|---|
| 3,804,751 | 4/1974 | McCord et al. | 210/914 X |
| 3,984,312 | 10/1976 | Dulin et al. | 210/751 X |
| 4,338,288 | 7/1982 | Rollmann | 210/914 X |
| 4,354,942 | 10/1982 | Kaczus et al. | 210/751 X |
| 4,432,666 | 2/1984 | Frey | 106/900 X |
| 4,613,374 | 9/1986 | Smith | 106/118 |

*Primary Examiner*—Tom Wyse
*Attorney, Agent, or Firm*—Sughrue, Mion, Zinn, Macpeak, and Seas

[57] ABSTRACT

A method for stabilizing a mercury-containing waste comprising adding elemental sulfur and cement kiln dust to the waste in amounts effective to reduce the amount of leachable mercury to an environmentally acceptable level.

11 Claims, No Drawings

STABILIZATION OF MERCURY-CONTAINING WASTE

FIELD OF THE INVENTION

The present invention relates to a method for treating/stabilizing mercury-containing waste in order to reduce the amount of leachable mercury in the waste to environmentally acceptable levels.

BACKGROUND OF THE INVENTION

Methods for treating various types of industrial wastes/sludges are known and have been practiced on a commercial scale. However, attempts to treat mercury-containing wastes/sludges in order reduce the mercury concentrations to environmentally acceptable levels have been scattered, and at best, marginally successful.

For example, U.S. Pat. No. 4,354,942 discloses a method for stabilizing mercury in mercury-containing materials by adding selected inorganic sulfur compounds thereto to prevent the removal or leaching of soluble mercury therefrom. The mercury-containing material is preferred to be pre-treated with a base such as lime or caustic sods. However, the use of inorganic sulfur compounds such as sulfides as disclosed in this patent often results in inadvertent mixing of acids with the sulfides, thereby releasing toxic hydrogen sulfide gas. Even alkaline solutions of certain sulfides emit malodorous vapors. Obviously, this type of treatment method, while effective in reducing the amount of leachable mercury, can cause detrimental effects to the environment.

U.S. Pat. No. 3,804,751 describes a method of disposing waste containing metallic mercury by treating the same with sulfuric acid, followed by neutralizing the treated waste with a basic (lime) slurry to convert the metallic mercury into an insoluble form.

The treatment of mercury in aqueous media by contacting the mercury-containing solution with a sulfide to form insoluble mercury sulfide is disclosed in U.S. Pat. Nos. 3,674,428, 4,147,626 and 4,614,592. However, in the context of mercury-containing wastes/sludges, the addition of a sulfide would cause the same type of toxic and malodorous gaseous vapors mentioned above due to the formation of hydrogen sulfide gas.

Also, methods known as solidification treatment of wastes/sludges by adding cement kiln dust or the like thereto are relatively widespread. Besides cement kiln dust, other calcia-type materials can be used for solidification purposes. See, e.g., R.B. Pojasek, *Toxic and Hazardous Waste Disposal*, Vol. 1, Ann Arbor Science Publishers, Inc. (1979).

Accordingly, although various attempts have been made in the past to treat mercury-containing wastes/sludges, room for improvement in such treatment methods clearly exists, particularly from an environmental standpoint.

SUMMARY OF THE INVENTION

Accordingly, one object of the present invention is to provide a method for restricting the concentration of toxic metals, particularly mercury, in a leachate of waste.

Another object of the present invention is to provide a method for treating toxic metal-containing waste to reduce the amounts of leachable toxic metals, particularly mercury, to below 20 parts per billion (ppb), preferably below 2 ppb.

Still another object of the present invention is to provide a method for stabilizing mercury-contaminated sludges in an economical and environmentally safe manner requiring only minimal equipment.

Yet another object of the present invention is to contribute to a clean environment by providing long-term assurance that leachate from toxic metal-containing wastes/sludges will not have an adverse impact on the surrounding environment.

The above and other objects and advantages of the present invention can be attained by a method for the stabilization of a mercury-containing waste which comprises adding elemental sulfur and cement kiln dust to the waste in amounts effective to reduce the amount of leachable mercury in the waste to an environmentally acceptable level.

Preferably, a strong base, such as a strong caustic, (e.g., sodium hydroxide) is also added to the waste with the sulfur and cement kiln dust. The amount of leachable mercury in said waste is reduced to the EPA Toxicity Characteristic Leaching Procedure (TCLP) standard for drinking water, calculated in accordance with 40 C.F.R., Part 141.11, p. 525 (July 1, 1986) (2 ppb) or less.

DETAILED DESCRIPTION OF THE INVENTION

Many types of industrial processes generate waste containing toxic metals, including mercury. Two common types of such waste to which the present invention is applicable are sludge wastes generated during the production of chlorine and caustic by electrolysis of concentrated brines, known in the industry as mercury cell chlor-alkali production. These types of sludges are referred to sometimes hereinafter as K071 waste, a designation used in experimental work by the present inventors and used by the EPA is categorizing this type of waste in RCRA. These types of waste are considered hazardous because of mercury contamination. Present K071 waste generation in the U.S. is estimated to be on the order of from 20,000 to 30,000 tons/year.

In particular, two types of K071 sludges, sodium chloride (naCl) and potassium chloride (KCl) have been tested extensively as representative mercury-containing waste. The laboratory studies discussed herein demonstrate the effectiveness of cement kiln dust (CKD) and sulfur (and caustic (NaOH) in preferred embodiments) stabilization for NaCL K071 sludge. These two particular mercury-containing NaCl and KCl sludges were generated at plants owned and operated by Occidental Chemical Corporation in Muscle Shoals, Alabama and Delaware City, Delaware.

The KCl K071 waste is a mixture obtained from clarifier and filter operations in the production of chlorine and caustic by electrolysis of concentrated brines. The waste primarily contains KCl (40–60%) and water (35–60%). The waste further contains $CaCO_3$ and hydroxides of iron, aluminum and magnesium. The sludge typically consists of fine particles and will not dewater easily. This type of KCl waste typically contains more mercury than the NaCl sludge.

NaCl K071 sludge is a mixture of sludges from such clarifier, filter press and saturator operations. However, clarifier and filter press produce a somewhat liquid homogenous sludge whereas the saturator operation produces a dry, coarse, sandy waste containing rock salt particles about one-quarter inch in diameter. Larger particles (up to about 4 inches in diameter) are composed of crystals of rock salt or clay-like balls of globulite ($Na_2SO_4 \cdot CaSO_4$). These two distinct streams are blended to obtain a solid waste with little or no free liquid. Depending on process conditions, the composited NaCl sludge will contain 0–60% of the saturator waste. Typically, a K071 NaCl waste contains 50% saturator waste. A typical NaCl sludge might be composed of calcium carbonate (30–40%), sodium chloride (30–40%) and water (20–35%) with magnesium, aluminum and iron hydroxides also present. The sludges are entirely inorganic.

Treatment of laborabory-size batches of KCl K071 waste in accordance with the present invention was satisfactorily demonstrated in the laboratory. Treatments of NaCl K071 waste in accordance with the present invention were carried out on laboratory samples and on a typical batch (25,400 lb) of waste as described hereafter in the example. Although the novel treatment method of the present invention has been experimentally tested on laboratory-size and typical industry-generated-size batches of mercury-containing KCl and NaCl waste, it will be understood by one of ordinary skill in the art that because of the seminal chemical reactions underlying the treatment process, the method of the present invention is applicable to a wide array of mercury-containing wastes/sludges, the only requirement being that the material to be treated contain leachable mercury.

Also, the treatment method of the present invention is beneficial in that levels of other free toxic metals which may be present in the waste, such as arsenic, barium, cadmium, chromium, lead, selenium, silver, copper, nickel, zinc and cobalt, may also be desirably reduced.

Although the CKD and sulfur (and, in preferred embodiments, a base such as caustic) may be added simultaneously to the mercury-containing waste, preferred results are obtained when the sulfur (and base) are added prior to adding the CKD.

One goal of the present invention is to reduce the amount of leachable mercury (as determined by the EPA Toxicity Characteristic Leaching Procedure (TCLP) (Federal Register, Vol. 51, No. 114, Part 261.24, p. 21685 (June 13, 1986) to below 20 ppb, which is ten times the drinking water standard. Leachable mercury analyses (TCLP) were performed using EPA approved methods and quality control procedures cited in "Test Methods for Evaluating Solid Waste" (SW-846). Mercury analyses were done by the cold vapor-/AA (atomic absorption) technique, Method 7470. Solidification treatment of mercury-containing sludges using CKD alone does reduce leachable mercury somewhat, but not to the very low ppb levels desired. Thus, to effectively stabilize the waste, i.e., to chemically tie up the toxic metals to prevent leaching from the waste, requires more than solidification by adding CKD. Reacting mercury with sulfide would appear to be beneficial, since mercury (II) sulfide is one of the most insoluble inorganic compounds. Hence, the use of mercury sulfide precipitation to purify contaminated waste waters is known, as mentioned above.

However, when sulfides are added directly or as soluble salts or partially soluble salts, and added indirectly as a sulfide-producing precursor, to a mercury-containing waste or sludge, although the amount of leachable mercury is reduced more than when adding CKD alone, the reduction amount is still not sufficient from an environmental standpoint. Further, soluble sulfide salts (free sulfides) are known to be hazardous upon acidification when contacting acids present in the waste. This produces poisonous hydrogen sulfide gas, as also mentioned above. Another drawback to addition of sulfides is that a large excess of sulfide in an alkaline environment will react with the mercury sulfide to form the more soluble mercury sulfide complex:

$$HgS + S^{2-} \rightarrow [HgS_2]^{2-}$$

See, e.g., W. H. Nebergall, H. F. Holtzclaw, Jr., and W. R. Robinson, "College Chemistry With Qualitative Analysis," D. C. Heath and Co., p. 861 (1980). This, in turn, contributes to undesirable mercury leaching from the waste.

Thus, in accordance with the treatment method of the present invention, elemental sulfur is added to the mercury-containing waste along with the CKD. This is preferably done in the presence of a strong base, such as caustic (e.g., NaOH and /or lime). Although elemental sulfur interacts with strong alkaline compounds to yield some sulfide or undergoes sulfide-type reactions, at any one time only a very small portion of the sulfur is converted so that sulfides are not generated in large amounts. Hence, exact process controls for excess sulfide formation and handling are not necessary in accordance with the present treatment method. In fact, the addition of a strong soluble caustic to the waste actually increases the magnitude of sulfide-type reactions (but still produces sulfides in amounts well below what would be present if inorganic sulfides were added directly to the waste rather than elemental sulfur), and this has unexpectedly been found to markedly reduce the amount of leachable mercury to a level of a few ppb. The underlying chemistry of the present process is believed to be as follows. It is considered that sulfur (S) and caustic ($OH^-$) form polysulfide ($S_x^{2-}$). The polysulfide then reacts with free leachable mercury ions to form an insoluble ($K_{sp} = 3 \times 10^{-52}$) mercury (II) sulfide (HgS):

$$S + OH^- \longrightarrow S_x^{2-}$$

$$S_x^{2-} + Hg^{2+} \longrightarrow HgS + S_{x-1}$$

It is also considered that the lime alkalinity in CKD is sufficient to generate polysulfide from sulfur. The addition of the strong caustic ensures that sufficient polysulfide is available to react with the free mercury ions to form the insoluble mercury sulfide. Further, the addition of water to the thus-treated waste will enable sulfur and alkalinity to interact over time; thus, the excess sulfur and alkalinity will act as a polysulfide reservoir and will resist any tendency for mercury to leach away.

The elemental sulfur is usually and most economically added to the mercury-containing waste in the form of solid, powdered sulfur, comprising about 0.5 to 3 wt % of the waste, and most preferably 1 wt % of the waste.

The most preferred strong base to be added to the mercury-containing waste is sodium hydroxide, which is added as a solution having a concentration of 30 to 70% NaOH, comprising about 0.5 to 10 wt % of the waste as NaOH and most preferably 3% of the waste as NaOH. Solid NaOH can also be employed if the waste contains sufficient water. Other suitable bases include KOH and $Ca(OH)_2$, added in similar amounts.

The caustic solution and sulfur are generally added to the mercury-containing waste in an amount effective to reduce the leachable mercury levels to environmentally acceptable limits. Thus, there is no particular restriction as to amounts which should be added, as this will be determined depending on the particular type of waste to be treated, the amounts of mercury contained in the waste and other factors. The appropriate amounts would be readily apparent to one of ordinary skill in the art. However, as an example, for a mercury-containing sludge containing up to 100,000 ppb mercury, the powdered sulfur is usually added in an amount of about 60 pounds per ton of waste to achieve the desired reduction in mercury level, while a 50% sodium hydroxide solution is added in an amount of about 120 pounds per ton of waste. These amounts, however, are only given as a general guideline, and it will be understood that widely varying amounts of these reagents will be necessary depending on the condition of the waste and the particular type of waste to be treated, in addition to the amount of leachable mercury present therein.

Preferred results can be obtained when the waste is thoroughly mixed after the addition of sulfur and the base prior to the addition of CKD.

The cement kiln dust employed in the process of the present invention can be selected from among many of those commercially available. Mineralogical and chemical compositions of over 100 different suitable cement kiln dusts are tabulated in Bureau of Mines Information Circular 8885. A commonly used type is RCI cement kiln dust (which may be obtained from the LaFarge Corporation, Demopolis, Alabama), which assignee Chemical Waste Management, Inc. has frequently employed in solidification treatments and which was used in the present stabilizations of K071 sludges.

In general, the amount of CKD added to the sludge is relatively large in order to solidify the sludge. Again, the particular amount to be added is not necessarily restricted, and will depend on the consistency of the waste/sludge and other factors, but as a general guideline, can be said to range from about 0.1 to 0.5 parts by weight CKD to 1 part by weight of the waste to be treated.

To determine the optimum ratio of CKD to waste, samples of the waste can be manually mixed for 5 minutes at room temperature using various ratios of CKD. The ratio selected is usually the one that used the minimum amount of CKD, yet achieved a practical level of structural integrity, e.g., 1 ton/ft$^2$ after 24 hours as measured by a Soil Test penetrometer. When additives were used, the waste was first stirred with the additive(s) for 5-10 minutes before CKD was added and stirred in.

The treatment conditions that are employed in accordance with the process of the present invention are not necessarily limited. However, as mentioned above, preferred results can be obtained when the sulfur and strong base are added prior to the addition of the cement kiln dust. It is further preferred that after the addition of the caustic, sulfur, and CKD, the treated waste is allowed to cure for several hours although the exact cure time is not particularly essential. In practice, however, the treated waste is usually allowed to cure for about 5 days to obtain optimal mercury stabilization. Although the temperature at which the curing of the treated waste takes place is not necessarily restricted, preferred results are obtained when cure temperatures ranging from about room temperature to about 35° C. are employed. In practice, however, temperatures of about 20°-25° C. obtain excellent results.

The present invention is explained hereinafter with reference to the following specific examples which are not intended to limit the scope of the present invention in any manner whatsoever.

EXAMPLE 1

A mixed K071 brine sludge (an NaCl brine sludge in this particular example) was treated/solidified in accordance with the present invention and by various comparative treatments using combinations of CKD, sulfur and sodium hydroxide as shown below. The K071 NaCl brine sludge used herein has the general characteristics of the K071 sludge described above. The results for various treatments are shown in Table 1 below:

TABLE 1

| K071 NaCl Sludge Sample No. | Additives | Cure Time (days) | Cure Temp. (°C.) | Hg as Recvd. (ppb) | Hg in Leachate (TCLP-ppb) |
|---|---|---|---|---|---|
| 1 | — | — | 23 | 54,000 | 900 |
| 2 | CKD* | 6 | 23 | " | 490 |
| 3 | CKD 6% NaOH | 5 | 23 | " | 120 |
| 4 | CKD 1% S | 6 | 23 | " | 20 |
| 5 | CKD 1% S 6% NaOH | 5 | 23 | " | 2 |
| 6** | — | — | 23 | 63,000 94,000 | 95 1,500 |
| 7 | CKD 1% S 1% NaOH | 5 | 23 | " | 13 |
| 8 | CKD 1% S 3% NaOH | 5 | 23 | " | 5 |
| 9 | CKD 1% S 9% NaOH | 5 | 23 | " | 2 |
| 10 | CKD 3% S 0.5% NaOH | 5 | 23 | " | 8 |
| 11 | CKD 3% S 3% NaOH | 5 | 23 | " | 3 |

*RCI cement kiln dust was used in all samples at a mix ratio of 0.2 parts (by wt) CKD to 1 part sludge.
**Mixed sample from two samples having the mercury content shown above.

As shown above in Table 1, the addition of 1% sulfur and 0.2 parts by wt CKD to the NaCl sludge in Sample No. 4 reduced the amount of mercury leachate to 20 ppb. Also, preferred results are obtained when NaOH is added as shown Sample Nos. 5 and 7-11 where mercury levels as low as 2 ppb can be obtained. Mercury levels lower than 2 ppb have also been obtained in additional experimental studies on varying samples of NaCl sludge.

Having thus generally described the present invention with reference to specific embodiments thereof, it will be understood by one of ordinary skill in the art that various modifications can be made thereto without departing from the spirit and scope thereof.

What is claimed is:

1. A method for stabilizing a mercury-containing waste comprising adding elemental sulfur and cement kiln dust to said waste in amounts effective to reduce the amount of leachable mercury in said waste to an environmentally acceptable level.

2. The method according to claim 1, wherein said mercury-containing waste is generated during the production of chlorine or caustic by electrolysis of concentrated brines.

3. The method according to claim 1, wherein said elemental sulfur is added to said waste prior to addition of said cement kiln dust in an amount of about 0.5 to 3 wt % of the waste, and said cement kiln dust is added to said waste in an amount of from about 0.1 to 0.5 parts by wt per 1 part waste.

4. The method according to claim 1, wherein said elemental sulfur is added in the form of solid powdered sulfur.

5. The method according to claim 1, which further comprises the addition of a strong base to the waste.

6. The method according to claim 5, wherein said strong base is NaOH, KOH or Ca(OH$_2$).

7. The method according to claim 6, wherein said strong base is NaOH.

8. The method according to claim 7, wherein said NaOH is added in an amount of from about 0.5 to 10 wt % of the waste as NaOH.

9. The method according to claim 8, wherein said NaOH is added as a solution of 30-70% NaOH.

10. The method according to claim 5, wherein said waste is mixed after the addition of said sulfur and said strong base prior to the addition of said cement kiln dust.

11. The method according to claim 1, wherein said waste is mixed after the addition of sulfur and prior to the addition of cement kiln dust.

* * * * *